United States Patent
Pilu et al.

(10) Patent No.: US 7,136,537 B2
(45) Date of Patent: Nov. 14, 2006

(54) SPECULAR REFLECTION IN CAPTURED IMAGES

(75) Inventors: Maurizio Pilu, Bristol (GB); Stephen Pollard, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 10/144,999

(22) Filed: May 15, 2002

(65) Prior Publication Data

US 2002/0172432 A1    Nov. 21, 2002

(30) Foreign Application Priority Data

May 17, 2001    (GB) .................................. 0112047.6

(51) Int. Cl.
*G06K 9/40*    (2006.01)

(52) U.S. Cl. ...................... 382/274; 382/260; 382/275; 358/3.26; 358/3.27

(58) Field of Classification Search ................. 382/167, 382/260, 265, 274, 275, 284, 315, 294, 255, 382/263; 358/1.2, 3.26, 3.27, 520, 540, 463
See application file for complete search history.

(56) References Cited

U.S. PATENT DOCUMENTS

| | | | |
|---|---|---|---|
| 4,317,620 A | | 3/1982 | Coppa et al. |
| 4,384,336 A | | 5/1983 | Frankle et al. |
| 4,423,936 A | | 1/1984 | Johnson |
| 4,541,704 A | | 9/1985 | Freeman |
| 4,605,970 A | | 8/1986 | Hawkins |
| 4,724,330 A | | 2/1988 | Tuhro |
| 5,084,611 A | * | 1/1992 | Okisu et al. ............... 250/208.1 |
| 5,091,654 A | | 2/1992 | Coy et al. |
| 5,194,729 A | * | 3/1993 | Okisu et al. ............... 250/222.1 |
| 5,345,284 A | | 9/1994 | Tsuruta |
| 5,436,733 A | * | 7/1995 | Terada et al. ............... 358/448 |
| 5,511,148 A | | 4/1996 | Wellner |
| 5,517,242 A | | 5/1996 | Yamada et al. |
| 5,585,926 A | * | 12/1996 | Fujii et al. ................... 358/471 |
| 5,764,383 A | * | 6/1998 | Saund et al. ................ 358/497 |
| 5,774,237 A | * | 6/1998 | Nako .......................... 358/471 |
| 5,990,901 A | * | 11/1999 | Lawton et al. .............. 345/581 |
| 6,040,923 A | * | 3/2000 | Takashimizu et al. ....... 358/498 |
| 6,057,851 A | * | 5/2000 | Luken et al. ................ 345/586 |
| 6,064,762 A | | 5/2000 | Haenel |
| 6,067,112 A | | 5/2000 | Wellner et al. |

(Continued)

FOREIGN PATENT DOCUMENTS

EP    0 595 299 B1    5/1994

(Continued)

OTHER PUBLICATIONS

Paul, "Robot Manipulators: Mathemactics, Programming, and Control," pp. 65-84 (1981), The MIT Press, USA.

(Continued)

*Primary Examiner*—Samir Ahmed
*Assistant Examiner*—Yosef Kassa
(74) *Attorney, Agent, or Firm*—Foley & Lardner LLP

(57) ABSTRACT

A method for selectively adjusting the amount of specular reflections appearing in the final image output by an image capturing device by blending two substantially perfectly overlapping images, one with natural specular reflections and one without specular reflections. In the combined image, the amount of specular reflection is lower than in the image having natural specular reflections, to the extent in many cases that the underlying image content can be seen. In any event, the apparatus provides means for selectively adjusting the intensity of specular reflection, or even eliminating it altogether, in each region of the image containing such reflection.

21 Claims, 4 Drawing Sheets

U.S. PATENT DOCUMENTS

| | | | |
|---|---|---|---|
| 6,297,889 B1 * | 10/2001 | Loce et al. | 358/1.9 |
| 6,366,657 B1 * | 4/2002 | Yagel et al. | 379/201.03 |
| 6,393,160 B1 * | 5/2002 | Edgar | 382/275 |
| 6,454,410 B1 * | 9/2002 | Berger et al. | 351/206 |
| 6,512,539 B1 * | 1/2003 | Dance et al. | 348/203 |
| 6,721,465 B1 * | 4/2004 | Nakashima et al. | 382/318 |

FOREIGN PATENT DOCUMENTS

| | | |
|---|---|---|
| EP | 0 622 722 A2 | 11/1994 |
| EP | 0 912 047 A2 | 4/1999 |
| EP | 0 924 923 A2 | 6/1999 |
| GB | 0103828.0 | 2/2001 |
| WO | WO 95/32581 | 11/1995 |
| WO | WO 00/38417 | 6/2000 |

OTHER PUBLICATIONS

Haralick et al., "Computer and Robot Vision," vol. II, pp. 53-56 (1993).

Bolles et al., "DPO: A Three-Dimensional Part Orientation System," pp. 1116-1120, Eighth Inter. Joint Conf. On AI, Germany, 1983.

* cited by examiner

SPECULAR REFLECTION IN CAPTURED IMAGES

FIELD OF THE INVENTION

This invention relates to a method and apparatus for controlling specular reflection appearing in an image captured by an image capturing device, such as a desktop or document camera or the like, and in particular for adjusting such specular reflection after an image has been captured.

BACKGROUND TO THE INVENTION

The applicants have found that in the context of a desktop or document camera, it is strongly desirable to use a strobe or the like to ensure appropriate illumination intensity and uniformity. In such close-up imaging situations, however, specularity caused by the strobe can be a serious problem in the case where the subject has a reflective or glossy surface, as in the case of many magazines, photographs and plastic objects.

In the applicant's copending British Patent Application No. 0103828.0 entitled "Digital Cameras" filed on 16 Feb. 2001, a number of methods are disclosed to ensure that specularity patches are eliminated from the final image. Such methods are generally based on two solutions, namely a single flash solution and a dual flash solution, both of which use at least two initial images to eliminate glare. The results of the disclosed methods is a final image which is devoid of any specular effect, i.e. as if the subject had been illuminated by uniform and diffuse light.

However, it is not always desirable to eliminate glare from a captured image altogether, as in many cases it has aesthetic significance in the sense that it can make the captured image look more natural and ensure that it appears three-dimensional, although in many cases, the glare created in a captured image masks some of the features of the subject, which is clearly undesirable as it detrimentally affects the quality of the captured image.

There are have been several arrangements proposed in the past in connection with digital/analog photography which are concerned with the adjustment or control of light exposure to the subject. For example, U.S. Pat. No. 4,317,620 describes a control system for controlling the intensity of the flash output of an image capturing device, depending on ambient light conditions, thereby varying the amount of glare appearing in the final image.

Initially, the control system measures the ambient scene light and then utilises the result of that measurement to control the intensity or amount of artificial illumination provided during the exposure interval of the image capturing device. If the ambient scene light is below a first predetermined level, the control system selects maximum flash intensity; if the ambient scene light is above a second predetermined level greater than the first predetermined level, the control system selects minimum flash intensity. If the ambient scene light is determined to be between the first and second predetermined levels, then the control system progressively varies the flash intensity in a manner which is inversely proportional to the measured ambient scene light.

However, there is no interaction between the control system and the user of the image capturing device, giving no user control of the specularity or glare appearing in the final image. Further, if the resultant glare is low, this also implies low scene brightness, which is an undesirable effect.

U.S. Pat. No. 4,423,936 describes a photographic exposure control system and method. However, such a system could not be used to attenuate or even remove glare areas within an image because such areas are often saturated so that it is not possible to recover the original image content from the captured pixels.

U.S. Pat. No. 4,541,704 describes a photographic camera apparatus having electronic image enhancement means intended to provide high quality, high resolution photographic prints that have been simultaneously electronically enhanced to compensate either for difficult or unfavourable scene lighting conditions as well as limitations in the film characteristics. The technique used to achieve these aims is often called dual exposure, and involves combining two (or more) images of a subject captured at different (typically increasing) exposure levels. Once again, however, there is no interaction between the user of the image capturing device and the electronic image enhancement means, all so-called enhancement of the final captured image is done automatically without any allowance for user requirements.

U.S. Pat. No. 4,384,336 describes an arrangement which uses algorithmic techniques to selectively enhance segmented areas of a captured image, by comparing the intensities of light being reflected from the subject(s) across the whole field of view of an image capturing device. However, it is not possible to modify glare patches in an image using this type of arrangement, because only a single image is used in the modification method. A single image is insufficient for use in modifying glare patches because such patches are often saturated and, therefore, contain no useful information about the subject. Further, there is little interaction between the user and the system to allow for individual requirements.

There are a few prior art documents which describe dual-flash camera arrangements, such as U.S. Pat. No. 5,345,284 which describes a camera arrangement including an electronic flash unit with two integrated flash heads. However, there is no disclosure or suggestion of the selective or interactive reduction, attenuation or elimination of shadows and/or glare.

International Patent Application No. WO95/32581 describes a system, such as a digitally imaged still photography system which captures a plurality of images simultaneously under different lighting conditions or with different backgrounds, and allows such images to be subsequently blended to exhibit certain characteristics. Similarly, there is a substantial body of prior art which is concerned with the optimisation of a final image using multiple images captured using different settings, including different optical or electrical exposure (e.g. WO00/38417), different magnification and focus settings, different lighting conditions, different spectral properties of the optics, for example colour filters, or a combination of two or more of these.

However, none of the above-mentioned known arrangements are concerned with the attenuation and/or elimination of specularity within a captured image, particularly without detrimentally affecting scene brightness of the final image.

Perhaps the best known method of eliminating specular reflection has been used in the field of photography for many years and uses a single polarizing filter placed in front of the camera lens. By selecting an appropriate angle of rotation of such a filter, it is possible to selectively attenuate/reduce specularity/reflections from the final captured image. A well known variation, often used in machine vision, uses a polarizer to polarize the illumination source and an analyser to filter the captured diffused light only, thereby eliminating the specular component. By rotating the analyser, different amounts of specularity can be selected.

SUMMARY OF THE INVENTION

In accordance with the present invention, there is provided apparatus for processing an image captured by an image capturing device, the apparatus comprising means for combining or blending at least one first image including a predetermined maximum level or intensity of specular reflection with a second image, which comprises said first image substantially without said specular reflection, to produce a third image, and means for adjusting the level or intensity of specular reflection in said third image to a level between said predetermined maximum level and substantially zero (inclusive).

Also in accordance with the present invention, there is provided a method of processing an image captured by an image capturing device, the method comprising the steps of combining or blending at least one first image including a predetermined maximum level or intensity of specular reflection with a second image, which comprises said first image substantially without said specular reflection, to produce a third image, and adjusting the specular reflection appearing in said third image to a level or intensity between said predetermined maximum level and substantially zero (inclusive).

In a preferred embodiment of the present invention, the apparatus and method involve the use of at least two first images of a subject, which could be captured using a single flash in two different positions, or two flashes, so that the resultant images each contain at least one patch of specular reflection in a different position relative to the subject. These images are used to produce the second image having no specular reflection or glare patches.

Thus, the present invention provides a method and apparatus whereby a user can select the level of specular reflection appearing in the final image, without any detrimental effect to the scene brightness, so as to provide maximum flexibility while maintaining optimum image quality.

The first and second images preferably have similar or substantially the same levels of exposure in the areas where little or no specular reflection appears in the first image, although this is not essential. The present invention provides a method and apparatus whereby a user can select the level or intensity of specular reflection appearing in the final image, without the need to recapture that image using a different level of exposure.

The level of specular reflection appearing in the third image (which is a combination of the first and second images) is somewhat lower than that appearing in the first image (which includes the natural specular reflections occurring in a predetermined level of exposure) to the extent that the image content underlying the levels of high specular reflection in the first image may be clearly visible. In any event, the apparatus preferably comprises a dial or similar analog means for adjusting the level of specular reflection in the third image according to personal preference.

In a preferred embodiment of the present invention, the apparatus includes means for allowing the user to select one or more discrete areas of the third image for adjustment.

Thus, the apparatus may include means for selecting one or more of the areas of specular reflection in the third image, and means for allowing the user to adjust, preferably selectively, or substantially eliminate the specular reflection appearing in those areas. In one exemplary embodiment of the invention, the third image is displayed on a computer screen, or the like, the apparatus including means to allow the user to click on, or otherwise select, an area of specular reflection, and means, such as an algorithmic automatic region segmentation means, for determining and selecting the entire 'glare patch'. The user can then select the amount by which the specular reflection defining that patch is to be attenuated. Thus, in this preferred embodiment, the apparatus beneficially includes means whereby the level of specular reflection appearing in each glare patch of an image can be set to a different level, as required. In fact, as each specular area or glare patch is selected by the user, an enquiry display or user input (UI) request may automatically appear to enable the user to enter the level of attenuation required for that particular specular area or glare patch.

Preferably, the combination of the first and second images is weighted, beneficially with a two-dimensional array of weights, in such a way as to alter the shape of a specular area or patch. For example, in one exemplary embodiment of the present invention, a Gaussian weight matrix may be applied to reduce the size of a specular area or patch, not just its intensity.

In one exemplary embodiment of the present invention, the second image may be obtained by suitably combining two or more images captured with two or more strobes in different positions relative to the subject, as described British Patent Application No. 0103828.0 referred to above, the entire contents of which are incorporated herein by reference. In this case, the specular areas or patches which can be selected for adjustment comprise a union set of those caused by the first strobe or flash and those caused by the second strobe or flash.

Alternatively, the second image may be obtained by suitably combining two or more images, at least one of which is captured with a strobe and at least one of which is captured with ambient illumination (i.e. without a strobe), as described in the applicant's above-mentioned co-pending application.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
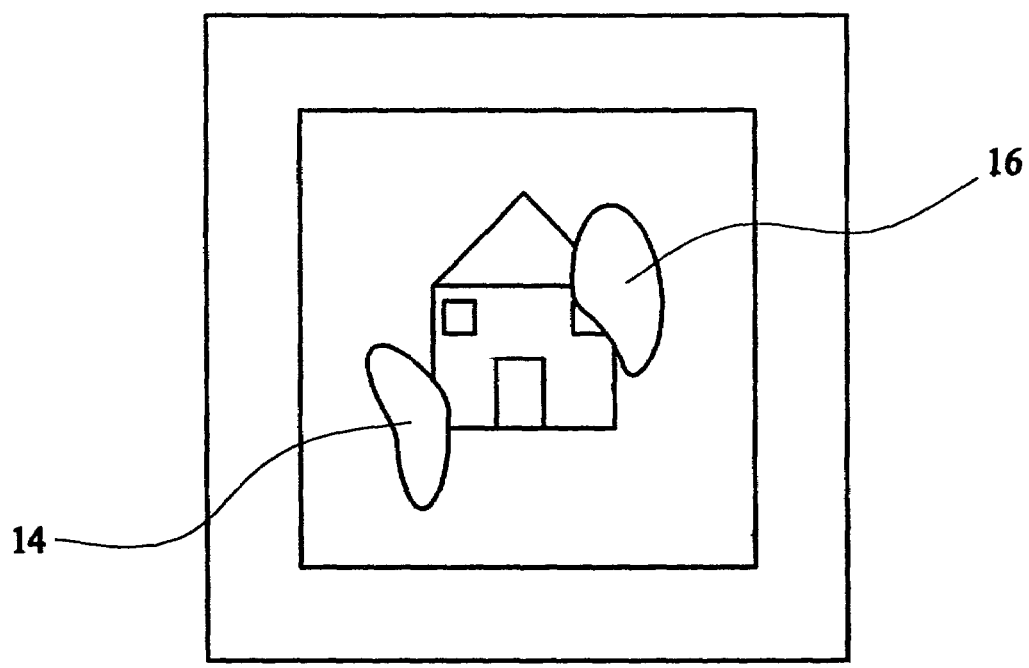
FIG. 1 is a schematic diagram illustrating an image created by combining two images captured using two different strobes or flashes.

As described in the applicant's co-pending British Patent Application No. 0103828.0, one way of obtaining an image of a subject with substantially no glare patches or specular reflection is to combine two or more images with two or more strobes or flashes in different positions relative to the subject. The resultant images might each contain one or more glare patches and, the conditions are set so that the glare patch(es) 14 appearing on one of the images will not overlap with the position(s) of the glare patch(es) 16 appearing in the other image(s), as shown schematically in FIG. 1 of the drawings.

Figure 2A:
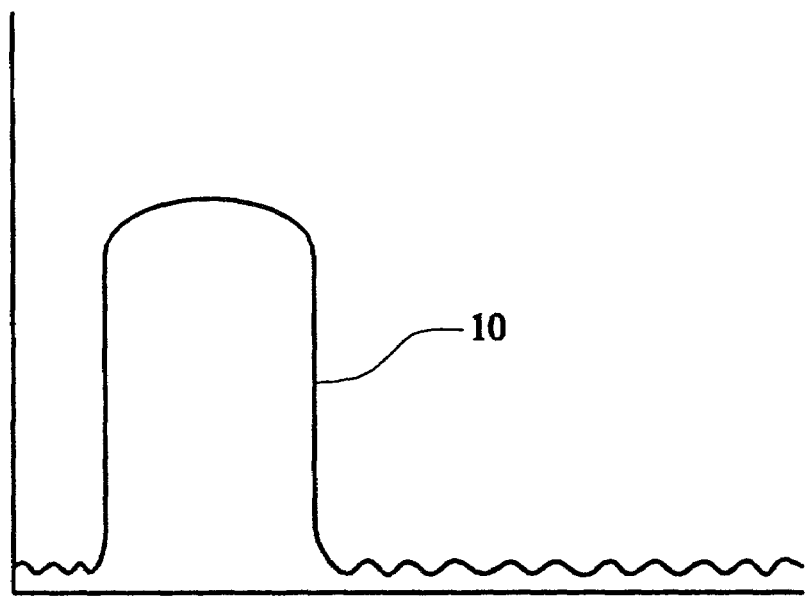
FIGS. 2A and 2B are respective graphical representations of the intensity of specular reflection appearing in the two images used to create the image of FIG. 1.
Figure 2B:
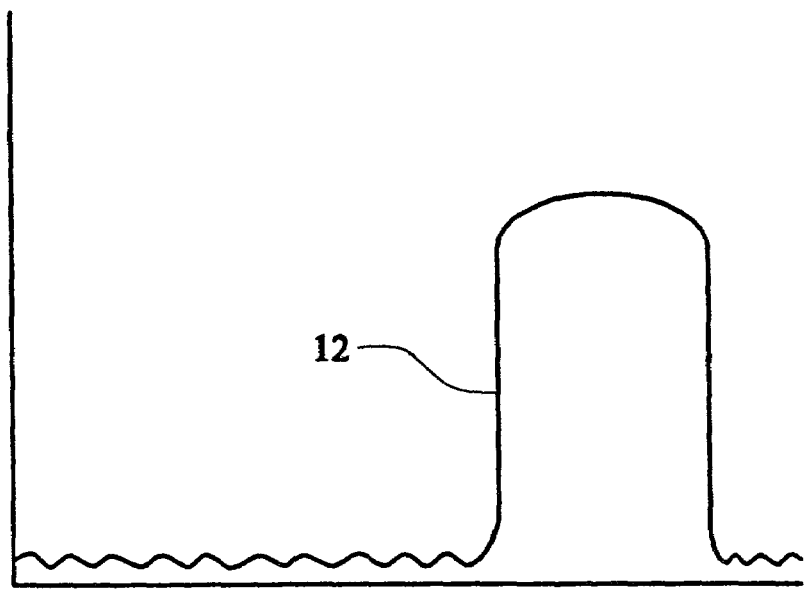
Figure 3:
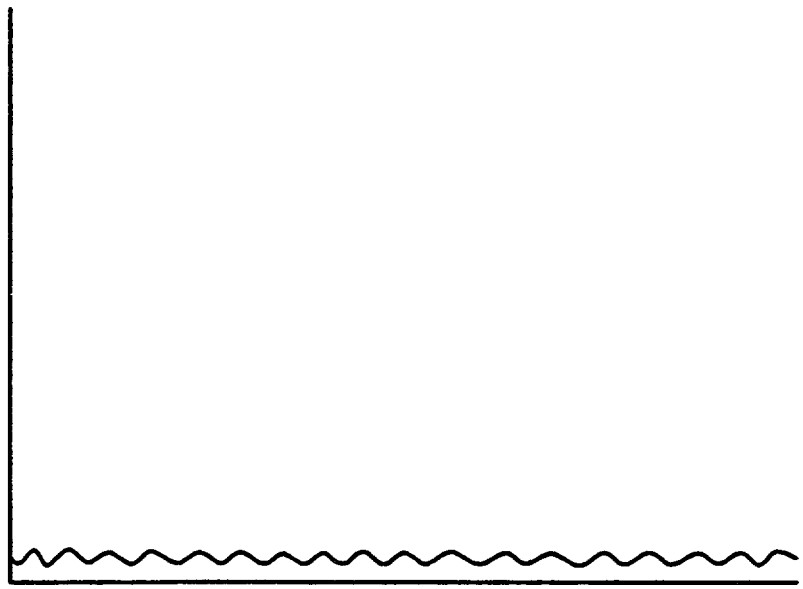
FIG. 3 is a graphical representation of the image of FIG. 1 having no specular reflection.

Referring to FIGS. 2A and 2B of the drawings, the intensity of specularity in the first and second images respectively can be represented graphically, as shown, with the visible sections of the captured image being represented by a relatively constant waveform, and the glare patches in each image beings represented by the peaks 10, 12 respectively. It can be seen that the peaks 10, 12 occur in different relative positions and, by combining the two images, and using only the minimum values thereof, the result is an image having no specular reflection, as represented graphically in FIG. 3 of the drawings.

The image containing full specular reflection (created as a combination of the first and second images referred to above) and the image containing no specular reflection are stored in the arrangement described above, so no further images need to be captured to perform the present invention.

In this exemplary embodiment of the present invention, the two above-mentioned images are blended. Many different methods of blending are known in the computer graphics field, and any of these methods can be used in the present invention. It should be noted, however, that in order to ensure better image quality, care needs to be taken to make sure that areas of the image with slight differences in hue/luminance are not blended as they do not correspond to specular patches.

Figure 4:
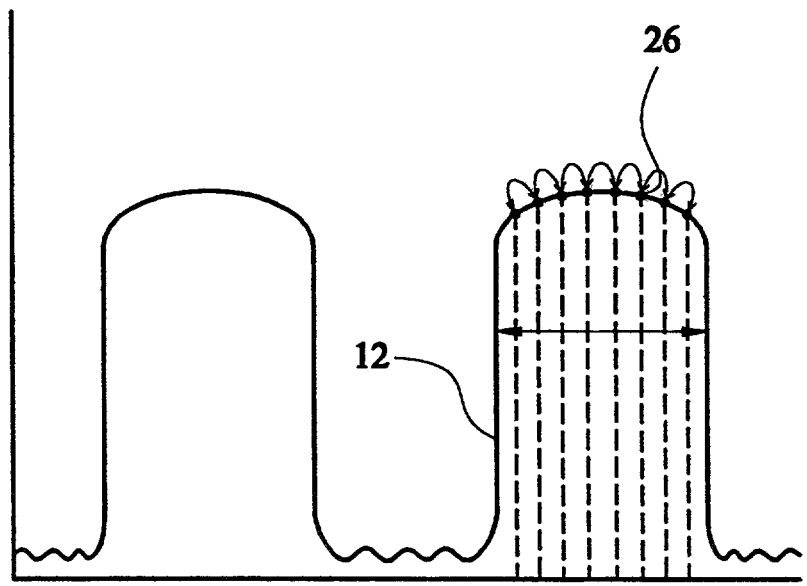
FIG. 4 is a schematic diagram to illustrate a region growing method for use in an exemplary embodiment of the present invention.

The individual selection of glare patches is also relatively straightforward to implement by a person skilled in the image processing art, and many suitable methods are envisaged. In fact, glare patches tend to be highly-saturated, a-chromatic and connected regions of the image, and standard region growing methods based on pixel similarity could be used to grow the specular area selected by the user. Referring to FIG. 4 of the drawings, if the user selects the glare patch 12 at the position numbered 26, region growing apparatus compares the pixels immediately adjacent the selected pixel 26 and includes in the selected region any of the pixels which are the same or similar to the selected pixel 26. The pixels immediately adjacent the selected region are then compared, and the region grown according to the result of the comparison. The apparatus will continue to grow the selected region in this manner until the difference between neighbouring pixels exceeds a predetermined value. Alternatively, the apparatus could be arranged to automatically find all the glare patches in the image before presenting the user with an interactive interface.

Figure 5:
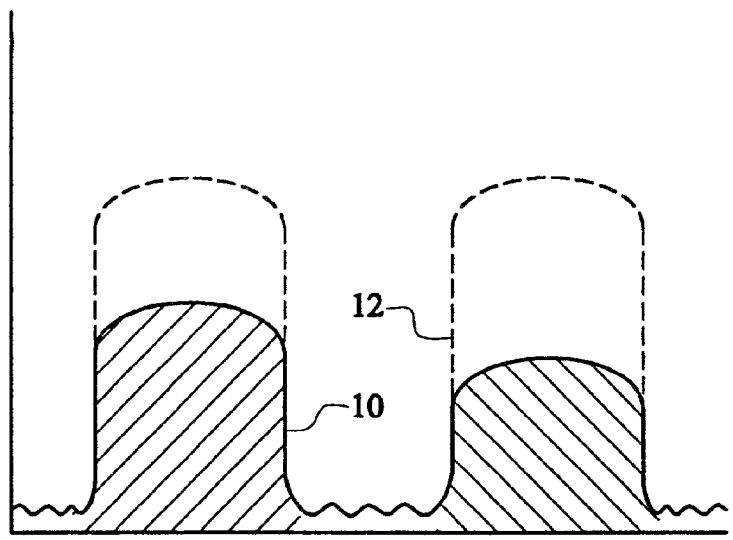
FIG. 5 is a graphical representation of the intensity of specular reflection appearing in the image of FIG. 1 when the intensity of the glare patches has been selectively reduced using an exemplary embodiment of the present invention.

Referring to FIG. 5 of the drawings, the method of the present invention can be achieved by selectively weighted blending of a first image containing maximum specular reflection or glare patches 10, 12, and a second image containing substantially no specular reflection. The user could, for example, select the first glare patch 10 and reduce its intensity to the level represented by the shaded area by weighting the blending of the corresponding areas of the two images. The user could then select the second glare patch 12 and reduce its level of intensity to the area represented by the shaded area by adjusting the weighting of the blending process accordingly.

Figures 6A, 6B, 6C:
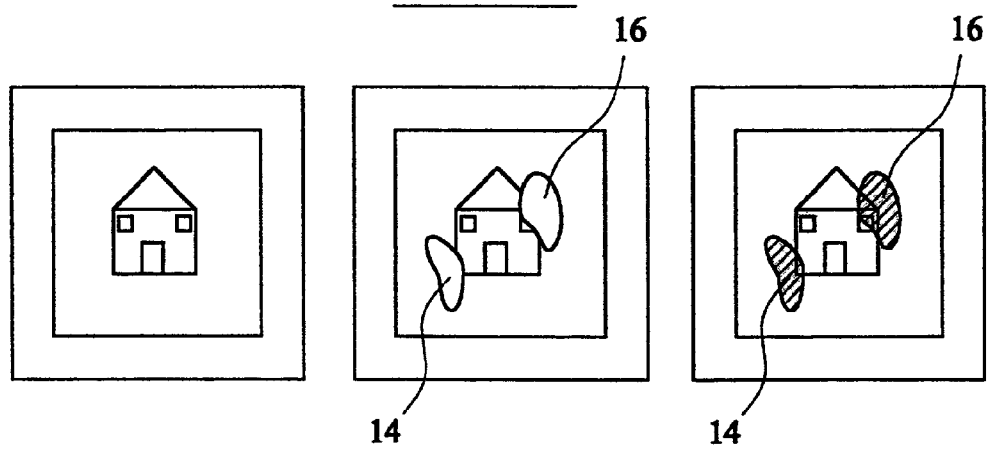
FIG. 6A–6F are schematic representations of various images which can be created using apparatus according to an exemplary embodiment of the present invention.
Figures 6D, 6E, 6F:
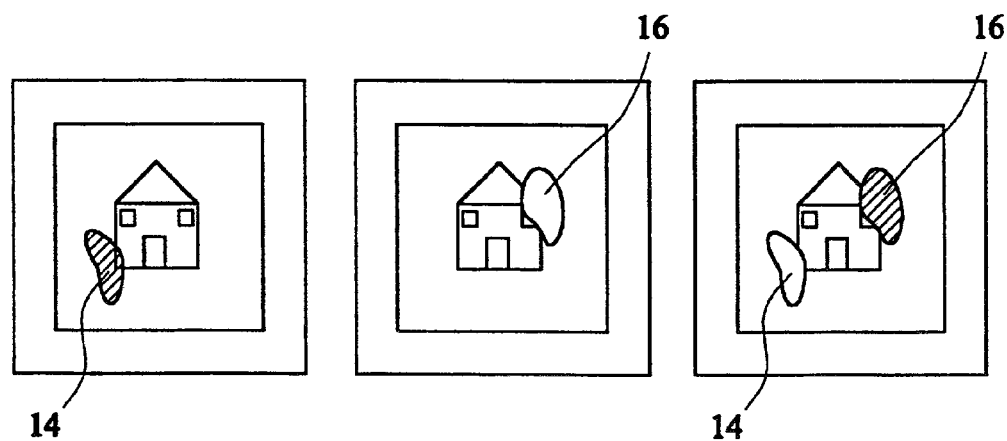

Referring to FIGS. 6A–6F of the drawings, a number of different versions of the same image are shown to more clearly illustrate the various options available to the user with the method of the present invention. FIG. 6A shows an image having no specular reflection, whereas FIG. 6B shows the same image having two glare patches 14, 16 of maximum intensity. FIG. 6C illustrates the case where both glare patches 14, 16 are still present in the image but their intensity is reduced (illustrated by the shaded areas), whereas FIG. 6D illustrates the case where one of the glare patches 14 is present in the image (with reduced intensity) and the other glare patch has been removed altogether. FIG. 6E illustrates a similar case where one of the glare patches 16 is present in the image (at maximum intensity) and the other glare patch has been removed. Finally, FIG. 6F illustrates the case where one of the glare patches 14 appears in the image at maximum intensity, and the other glare patch 16 appears in the image at reduced intensity.

Although the present invention has been described by way of examples of a preferred embodiment, it will be evident that other adaptations and modifications may be employed without departing from the scope of the invention as defined by the appended claims. Further, the terms and expressions employed herein have been used as terms of description and not of limitation; and, thus, there is no intent to exclude equivalents, but on the contrary it is intended to cover any and all equivalents which may be employed without departing from the scope of the invention as defined by the appended claims.

The invention claimed is:

1. Apparatus for processing an image captured by an image capturing device, the apparatus comprising:

a processing apparatus for combining or blending at least one first image including a predetermined maximum level or intensity of specular reflection with a second image to produce a third image wherein said second image consists of said first image substantially without said specular reflection, and an adjustor for adjusting the level or intensity of specular reflection appearing in said third image to a level between said predetermined maximum level and substantially zero.

2. Apparatus according to claim 1, wherein said processing apparatus is arranged to combine or blend at least two first images of a subject, to produce the second image having no specular reflection or glare patches.

3. Apparatus according to claim 1, further comprising an analog adjustor for adjusting the level or intensity of specular reflection appearing in said third image.

4. Apparatus for processing an image captured by an image capturing device, the apparatus comprising:

a processing apparatus for combining or blending at least one first image including a predetermined maximum level or intensity of specular reflection with a second image to produce a third image wherein said second image consists of said first image substantially without said specular reflection, an adjustor for adjusting the level or intensity of specular reflection appearing in said third image to a level between said predetermined maximum level and substantially zero, and a selector for selecting one or more discrete areas of said third image for adjustment.

5. Apparatus according to claim 4, wherein the selector is arranged for selecting one or more areas of the third image containing specular reflection, and wherein the selector includes means for selectively adjusting the level or intensity, or substantially eliminating, the specular reflection in the one or more areas.

6. Apparatus according to claim 5, wherein the selector is arranged for allowing the user to select a portion of an area of the third image containing specular reflection, and for automatically determining a substantially complete area of specular reflection for adjustment.

7. Apparatus according to claim 6, wherein said selector, when used for automatically determining a substantially complete area of specular reflection, employs algorithmic automatic region segmentation.

8. Apparatus according to claim 5, wherein said selector is adapted to enable the level of attenuation of specular reflection required for each selected area to be entered.

9. Apparatus according to claim 1, wherein the combination of said first and second images is weighted with a two-dimensional array of weights, in such a way as to alter the shape of a specular area.

10. Apparatus according to claim 1, wherein said second image is obtained by combining two or more images captured with two or more strobes in different positions relative to a subject.

11. Apparatus according to claim 1, wherein said second image is obtained by combining two or more images, at least one or which is captured with a strobe and at least one of which is captured with ambient illumination.

12. A method of processing an image captured by an image capturing device, the method comprising the steps of:
combining or blending at least one first image including a predetermined maximum level or intensity of specular reflection with a second image, which comprises said first image substantially without said specular reflection, to produce a third image, and
adjusting the specular reflection appearing in said third image to a level or intensity between said predetermined maximum level and substantially zero.

13. A method according to claim 12, further comprising the step of combining or blending at least two first images of a subject to produce the second image having no specular reflection or glare patches.

14. A method of processing an image captured by an image capturing device, the method comprising:
combining or blending at least one first image including a predetermined maximum level or intensity of specular reflection with a second image, which comprises said first image substantially without said specular reflection, to produce a third image,
adjusting the specular reflection appearing in said third image to a level or intensity between said predetermined maximum level and substantially zero, and
selecting one or more discrete areas of said third image for adjustment.

15. A method according to claim 14, further comprising the steps of:
selecting one or more areas of said third image containing specular reflection, and
selectively adjusting the level or intensity of specular reflection and/or eliminating said specular reflection in the one or more selected areas.

16. A method according to claim 12, further comprising the step of obtaining said second image by combining two or more images captured with two or more strobes in different positions relative to a subject.

17. A method according to claim 12, further comprising the step of obtaining said second image by combining two or more images, at least one of which is captured with a strobe and at least one of which is captured with ambient illumination.

18. Apparatus for processing an image captured by an image capturing device, the apparatus comprising:
a processing apparatus for combining or blending at least one first image including one or more specular reflection or glare patches with a second image to produce a third image, said second image comprising said first image having no specular reflection or glare patches, to produce a third image, and
an analog adjustor for manually adjusting the intensity of one or more of the specular reflection or glare patches appearing in said third image.

19. Apparatus for processing an image captured by an image capturing device, the apparatus comprising:
a processing apparatus for combining or blending at least one first image including a predetermined maximum level or intensity of specular reflection with a second image to produce a third image wherein said second image said first image comprises said first image without said specular reflection,
an adjustor for adjusting the level or intensity of specular reflection, and
a selector for selecting one or more discrete areas of specular reflection in said selected one or more discrete areas of said predetermined maximum level and substantially zero.

20. Apparatus according to claim 3, wherein said analog adjustor corresponds to a dial that is capable of being set by a user to obtain a desired level or intensity of specular reflection.

21. Apparatus according to claim 9, wherein the two-dimensional array of weights corresponds to a Gaussian weight matrix that alters a size, the shape and the intensity of specular reflection.

* * * * *